United States Patent [19]

Gamlen

[11] 4,065,545

[45] Dec. 27, 1977

[54] STABILIZED HYPOCHLOROUS ACID AND HYPOCHLORITE SOLUTIONS

[75] Inventor: Philip Hugh Gamlen, Runcorn, England

[73] Assignee: Imperial Chemical Industries Limited, London, England

[21] Appl. No.: 756,734

[22] Filed: Jan. 4, 1977

[30] Foreign Application Priority Data

Jan. 29, 1976 United Kingdom ................. 3545/76

[51] Int. Cl.$^2$ ....................... C01B 11/04; C01B 11/06
[52] U.S. Cl. .................................... 423/265; 423/275; 423/473; 423/474
[58] Field of Search ............... 423/265, 473, 474, 476, 423/275

[56] References Cited

U.S. PATENT DOCUMENTS

| | | | |
|---|---|---|---|
| 3,749,672 | 7/1973 | Golton et al. | ................... 423/473 X |
| 3,793,216 | 2/1974 | Dychdala et al. | ............... 423/474 X |

FOREIGN PATENT DOCUMENTS 42-531   1/1967   Japan ..................................... 423/473

*Primary Examiner*—Edward Stern
*Attorney, Agent, or Firm*—Cushman, Darby & Cushman

[57] ABSTRACT

An aqueous hypochlorite solution containing a stabilizing amount of periodate ions, preferably an amount in the range 0.05 to 1000 parts per million (ppm) by weight based on the volume of the solution, the solution optionally containing silicate ions.

8 Claims, No Drawings

STABILIZED HYPOCHLOROUS ACID AND HYPOCHLORITE SOLUTIONS

The present invention relates to the stabilisation of aqueous hypochlorite solutions.

Aqueous hypochlorite solutions, for example, solutions of alkali metal and alkaline earth metal hypochlorites, have a tendency to be unstable. In particular the hypochlorite ions in such solutions decompose to give chlorate ions or chloride ions and oxygen. The decomposition of hypochlorite ions to give chloride ions and oxygen is catalysed by the presence of trace impurities of metal compounds, especially compounds of nickel, copper, and iron, some or all of which are known to be present in commercially produced hypochlorite solutions. Nickel and iron are generally present as insoluble suspensions of hydroxides in proportions of sub parts per million and parts per million respectively, whereas copper is generally present as a soluble salt at the sub part per million level. Furthermore, the catalytic activity of each of the aforesaid metal compounds may significantly be enhanced by the presence in the hypochlorite solution of one or both of the other metal compounds, that is, in the presence of two or more of the metal compounds there may be a synergistic effect on the rate of decomposition of the hypochlorite.

It is known to use silicate ions to stabilise hypochlorite solutions. The stabilising effect of silicate ions is believed to result from the adsorption of the silicate ions on the surface of the metal compound when the metal compound is in an insoluble form. Thus, where the metal compound is in the form, for example, of a suspension of iron and/or nickel hydroxide in the hypochlorite solution silicate ions have a stabilising effect. Silicate ions, however, have little or no stabilising effect when the metal compound is in solution in the hypochlorite solution, for example, when the metal compound is a soluble copper compound.

We have now found an additive for stabilising hypochlorite solutions which is effective in the presence of metal compounds even when the metal compounds are in the form of a solution in the hypochlorite, for example, when the metal compound is a soluble copper compound.

According to the present invention we provide an aqueous hypochlorite solution containing a stabilising amount of periodate ions.

By stabilising amount of periodate ions we mean an amount of periodate ions which reduces the rate of decomposition of hypochlorite ions caused by the presence of trace metal compounds in the hypochlorite solution.

The stabilising effect of periodate ions may readily be observed by comparing the oxygen evolution of a hypochlorite solution containing metal compounds with the oxygen evolution of such a solution which contains in addition periodate ions.

The proportion of periodate ions required to stabilise the hypochlorite solution will depend on the amount of metal compound impurities present, and in particular on the amount of nickel and copper compounds, but in general suitable proportions are in the range from 0.05 to 1000 ppm, for example 1 to 100 ppm, especially 10 to 100 ppm. The ppm (parts per million) concentration is expressed on the basis of the weight of the periodate ions per unit volume of solution.

We have found that with increase in the amount of periodate ions in the hypochlorite solution the rate of decomposition of the hypochlorite decreases and that little or no further decrease in the rate of decomposition can be achieved where the amount of periodate exceeds that which is required to react stoichiometrically with the total amount of copper and nickel compounds present in the solution. Thus, with increase in the amount of periodate ions in the hypochlorite solution the rate of decomposition of the hypochlorite approaches that which would be obtained with a hypochlorite solution which did not contain any metal compound impurities.

Suitable periodates for use in the hypochlorite solution are periodates which are soluble in the solution at the concentrations required to effect stabilisation and include alkali metal periodates, e.g. sodium and potassium periodates, and ammonium periodate. The periodate may be added as such to the hypochlorite solution but it is perferably added as a solution in water.

In addition to periodate ions the hypochlorite solution may also contain silicate ions derived, for example, from an alkali metal silicate, e.g. sodium silicate. The proportion of silicate ions is preferably in the range 100 to 1000 ppm (expressed as weight per unit volume of solution), for example in the range 250 to 400 ppm. The use of periodate ions in combination with silicate ions is especially suitable for stabilising hypochlorite solutions containing nickel and iron compound impurities in addition to copper compound impurities.

The hypochlorite may be any hypochlorite which is soluble in water, for example alkali metal hypochlorites, e.g. sodium hypochlorite, alkaline earth water hypochlorites and hypochlorous acid. The concentration of hypochlorite may vary over a wide range, for example over the range 0.1% to 20% weight/volume of available chlorine.

The invention is especially applicable to sodium hypochlorite solutions which are the cheapest and most commonly available commercially. The commercially available hypochlorite solutions, for example sodium hypochlorite, may contain proportions of other materials, for example caustic soda and/or sodium carbonate.

The invention is illustrated by the following Examples:

EXAMPLES 1 to 3

A sample of commercially available sodium hypochlorite solution (14.3% available chlorine; manufactured by Imperial Chemical Industries Limited) was tested by Atomic Adsorption Spectroscopy to determine the levels of iron, copper and nickel compounds in the solution. Further quantities of aqueous solutions of ferrous sulphate, copper sulphate and nickel sulphate were then added to the hypochlorite solution to increase the concentrations of the metal compound in the solution to amounts corresponding to 0.52 ppm Fe, 1.71 ppm Cu and 0.026 ppm Ni. Potassium periodate solution (containing 1.0 g $KIO_4$/100 g warm $H_2O$) was then added to three aliquots of the hypochlorite solution containing the aforementioned proportions of iron, copper and nickel, to give hypochlorite solutions containing (1) 500 ppm (Example 1) (2) 100 ppm (Example 2) and (3) 60 ppm (Example 3) of $IO_4^-$ ions respectively as stabiliser.

The stability of the aforesaid hypochlorite solutions containing potassium periodate was assessed by measuring the volume of oxygen was evolved from 300 g of hypochlorite solution at 37° C over a period of 20 hours.

The volumes of oxygen evolved were (1) 20 ml (2) 27 ml and (3) 29 ml respectively.

By way of comparison the above procedure was repeated with metal compound-containing hypochlorite solutions containing 0.52 ppm Fe, 1.71 ppm Cu and 0.026 ppm Ni except that the $KIO_4$ was replaced in one experiment with 100 ppm of $SiO_3^{2-}$ ions (as sodium silicate $Na_2SiO_3$) and in a second experiment that $KIO_4$ was omitted. The volumes of oxygen evolved from 300 g hypochlorite solutions at 37° C over 20 hours were respectively 535 ml and 473 ml.

EXAMPLE 4

The procedure of Example 1 was repeated with a hypochlorite solution containing metal compounds in amounts corresponding to 0.52 ppm Fe, 1.76 ppm Cu and 0.026 ppm Ni except that 50 ppm of $IO_4^-$ (as $KIO_4$) and 50 ppm of $SiO_3^{2-}$ ions (as $Na_2SiO_3$) were added to the solution as stabiliser. The volume of oxygen evolved from 300 g of hypochlorite solution at 37° C over 20 hours was 46 ml.

EXAMPLES 5 to 7

The procedure of Example 1 was repeated using a hypochlorite solution containing metal compounds in amounts corresponding to 1.77 ppm Fe, 0.01 ppm Cu and 0.026 ppm Ni and to which had been added respectively (1) 500 ppm (Example 5) (2) 100 ppm (Example 6) and (3) 50 ppm of $IO_4^-$ ions (as $KIO_4$) (Example 7). The volumes of oxygen evolved from 300 g of hypochlorite solution at 37° C over a period of 20 hours was (1) 20.7 ml (2) 25.7 ml and (3) 25.2 ml respectively.

By way of comparison, the above procedure was repeated in four separate experiments with metal compound-containing hypochlorite solutions containing 1.77 ppm Fe, 0.01 ppm Cu and 0.026 ppm Ni except that $KIO_4$ was replaced by (1) 500 ppm (2) 100 ppm and (3) 50 ppm of $SiO_3^{2-}$ ions (as $Na_2SiO_3$), and in a fourth experiment the $KIO_4$ was omitted and no $Na_2SiO_3$ was added. The volumes of oxygen evolved from 300 g of hypochlorite solution at 37° C over 20 hours were respectively (1) 34 ml (2) 41 ml (3) 59 ml and (4) 115 ml.

EXAMPLES 8 to 10

The procedure of Example 1 was repeated using a hypochlorite solution containing metal compounds in amounts corresponding to 1.02 ppm Fe, 0.51 ppm Cu and 0.026 ppm Ni and to which had been added (1) 500 ppm (Example 8) (2) 100 ppm (Example 9) and (3) 50 ppm (Example 10) respectively of $IO_4^-$ ions (as $KIO_4$). The volumes of oxygen evolved from 300 g of hypochlorite solution at 37° C over a period of 20 hours were (1) 35 ml (2) 47 ml and (3) 33 ml respectively.

By way of comparison, the above procedure was repeated with metal compound-containing hypochlorite solutions containing 1.02 ppm Fe, 0.51 ppm Cu and 0.026 ppm Ni except that in one experiment the $KIO_4$ was replaced by 100 ppm of $SiO_3^{2-}$ ions (as $Na_2SiO_3$) and in a second experiment the $KIO_4$ was omitted. The volumes of oxygen evolved from 300 g hypochlorite at 37° C over 20 hours were 113 ml and 228 ml respectively.

EXAMPLE 11

The procedure of Example 1 was repeated using a hypochlorite solution containing metal compounds in amounts corresponding to 1.02 ppm Fe, 0.51 ppm Cu and 0.026 ppm Ni and to which had been added 50 ppm of $IO_4^-$ ions (as $KIO_4$) and 50 ppm of $SiO_3^{2-}$ ions (as $Na_2SiO_3$). The volume of oxygen evolved from 300 g of hypochlorite solution at 37° C over 20 hours was 49.7 ml.

EXAMPLES 12 to 18

In order to show that little further improvement in the stabilising effect produced by addition of periodate ions to copper-and-nickel-compound-containing hypochlorite solutions is achieved when the amount of periodate which is added to the solution exceeds that which is necessary to react stoichiometrically with the total amount of copper and nickel compounds in the solution the procedure of Example 1 was repeated using $NaIO_4$ in place of the $KIO_4$ of Example 1 and using hypochlorite solutions containing metal compounds in amounts corresponding to 0.52 ppm Fe, 0.03 ppm Ni and 1.71 ppm Cu. The amounts of $IO_4^-$ ions added to the solutions were, respectively, 0.05 ppm, 1.0 ppm, 2.0 ppm, 10 ppm, 20 ppm and 100 pp. The stoichiometrically required amount of $IO_4^-$ ions is 10 ppm.

The volume of oxygen evolved from 300 g of hypochlorite solutions at 37° C over a period of 20 hours are given in the following table.

| Example | $KIO_4$ ppm | Oxygen evolved ml |
| --- | --- | --- |
| 12 | 0.05 | 483 |
| 13 | 1.0 | 406 |
| 14 | 2.0 | 277 |
| 15 | 5 | 75 |
| 16 | 10 | 63 |
| 17 | 20 | 50 |
| 18 | 100 | 51 |

What I claim is:

1. In an aqueous solution containing a hypochlorite selected from the group consisting of alkali metal hypochlorite, alkaline earth metal hypochlorite, and hypochlorous acid, and, as impurity, a metal compound selected from the group consisting of nickel, iron and copper compounds or mixtures of such compounds, the improvement wherein the solution also contains a stabilizing amount of periodate ions.

2. A solution as claimed in claim 1 in which the periodate ions are present in a proportion in the range 0.05 to 1000 parts per million (ppm) by weight based on the volume of the solution.

3. A solution as claimed in claim 2 in which the periodate ions are present in a proportion in the range 1 to 100 ppm.

4. A solution as claimed in claim 1 in which the periodate ions are provided by an alkali metal periodate present in the solution.

5. A solution as claimed in claim 1 which also contains silicate ions.

6. A solution as claimed in claim 5 in which silicate ions are present in a proportion in the range 10 to 100 ppm by weight based on the volume of the solution.

7. An aqueous solution as claimed in claim 1 wherein the periodate ions are derived from sodium, potassium or ammonium periodate and the amount of said ions is sufficient to react stoichiometrically with said metal compound or mixture thereof present in said solution.

8. A stabilized aqueous hypochlorite solution consisting essentially of a hypochlorite selected from the group consisting of alkali metal hypochlorites, alkaline earth metal hypochlorites, and hypochlorous acid, a trace amount of at least one metal compound selected from the group consisting of nickel, iron and copper compounds which normally tend to catalyze decomposition of the hypochlorite and a stabilizing amount of periodate ion present in amount sufficient to reduce the rate of decomposition of the hypochlorite by said metal compound.

* * * * *